US011817760B2

(12) United States Patent
Looser et al.

(10) Patent No.: US 11,817,760 B2
(45) Date of Patent: Nov. 14, 2023

(54) ELECTRICAL MACHINE

(71) Applicant: Celeroton AG, Volketswil (CH)

(72) Inventors: Andreas Looser, Volketswil (CH);
Fabian Dietmann, Volketswil (CH);
Manuel Blaser, Volketswil (CH);
Lukas Weinrich, Volketswil (CH);
Konrad Hertig, Volketswil (CH)

(73) Assignee: CELEROTON AG, Volketswil (CH)

( * ) Notice: Subject to any disclaimer, the term of this patent is extended or adjusted under 35 U.S.C. 154(b) by 514 days.

(21) Appl. No.: 17/255,676

(22) PCT Filed: Jun. 27, 2019

(86) PCT No.: PCT/EP2019/067172
§ 371 (c)(1),
(2) Date: Dec. 23, 2020

(87) PCT Pub. No.: WO2020/002509
PCT Pub. Date: Jan. 2, 2020

(65) Prior Publication Data
US 2021/0242747 A1 Aug. 5, 2021

(30) Foreign Application Priority Data
Jun. 29, 2018 (EP) ..................................... 18180755

(51) Int. Cl.
| H02K 5/167 | (2006.01) |
| H02K 5/20 | (2006.01) |
| H02K 9/22 | (2006.01) |
| H02K 1/20 | (2006.01) |
| H02K 5/24 | (2006.01) |

(Continued)

(52) U.S. Cl.
CPC ............. *H02K 5/1675* (2013.01); *H02K 1/20* (2013.01); *H02K 5/207* (2021.01); *H02K 5/24* (2013.01); *H02K 7/085* (2013.01); *H02K 9/06* (2013.01); *H02K 9/22* (2013.01); *H02K 9/223* (2021.01)

(58) Field of Classification Search
CPC ........ H02K 5/1675; H02K 5/207; H02K 5/24; H02K 9/223; H02K 9/06; H02K 1/20
See application file for complete search history.

(56) References Cited

U.S. PATENT DOCUMENTS

| 3,502,920 A | 3/1970 | Chaboseau |
| 3,974,406 A | 8/1976 | Wehde |
| (Continued) | | |

FOREIGN PATENT DOCUMENTS

| EP | 3 249 786 | 11/2017 |
| GB | 724389 | 2/1955 |
| WO | 03/019753 | 3/2003 |

*Primary Examiner* — Robert W Horn
(74) *Attorney, Agent, or Firm* — Rankin, Hill & Clark LLP

(57) ABSTRACT

An electrical machine has a stator with a stator body supporting an electrical stator and a rotor. The rotor is supported by bearing including a radial bearing section forming a radial gas bearing and an axial bearing section forming an axial gas bearing, the stator side parts of these bearing sections being a stator side radial bearing part and a stator side axial bearing part that are rigidly connected to one another and together form a stator bearing structure. The stator side radial bearing part is a bushing, and is radially surrounded by a cooling body. The bushing is connected to the cooling body by an elastic support comprising a thermally conducting filler.

18 Claims, 3 Drawing Sheets

(51) Int. Cl.
*H02K 7/08* (2006.01)
*H02K 9/06* (2006.01)

(56) References Cited

U.S. PATENT DOCUMENTS

| | | |
|---|---|---|
| 11,329,529 B2 * | 5/2022 | Looser .................... H02K 5/24 |
| 2006/0061222 A1 | 3/2006 | McAuliffe et al. |
| 2006/0186750 A1 | 8/2006 | Hosoe |
| 2021/0242747 A1 * | 8/2021 | Looser .................. H02K 5/128 |

* cited by examiner

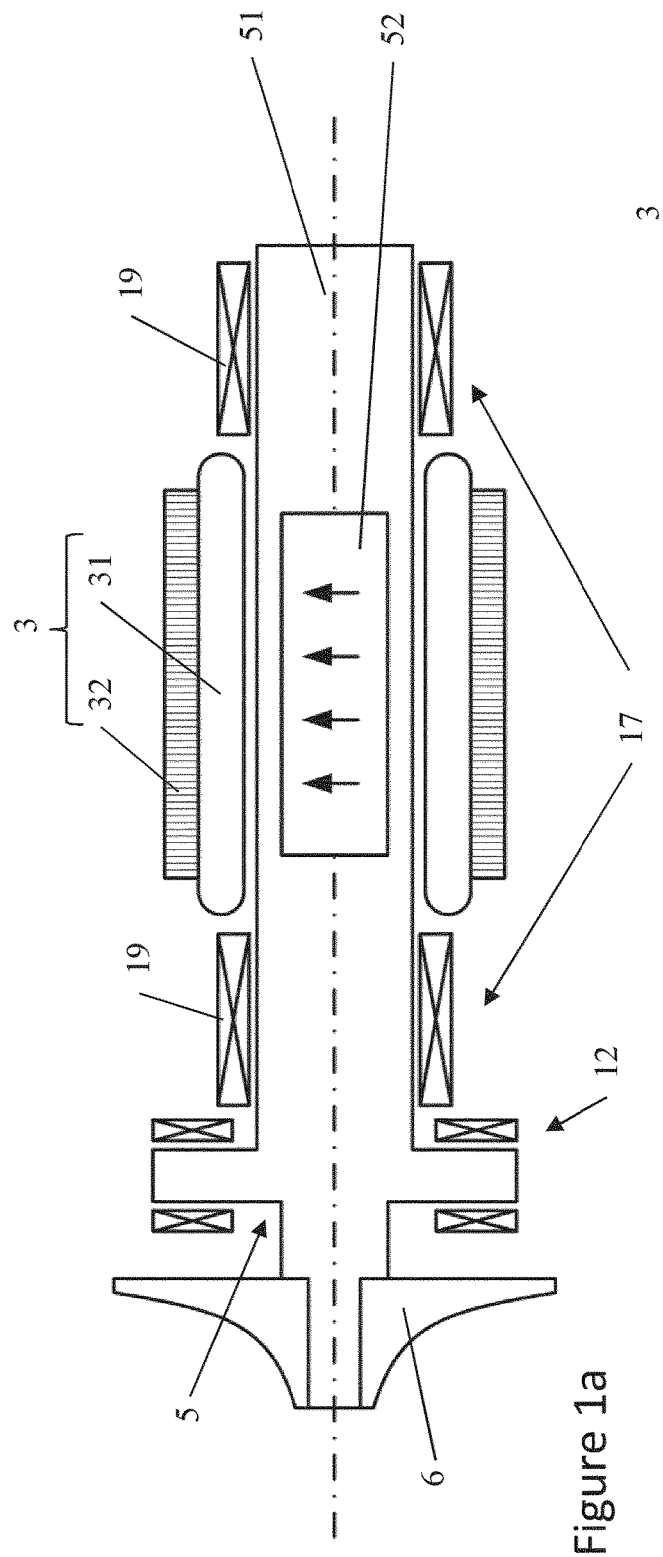
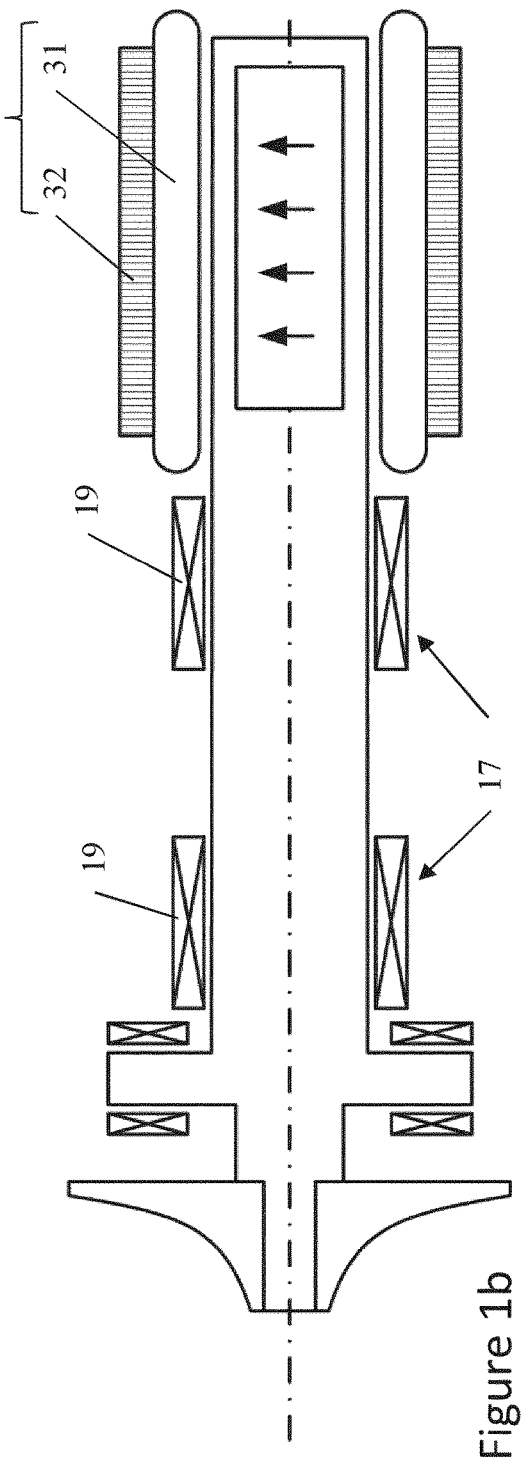
Figure 1a
Figure 1b

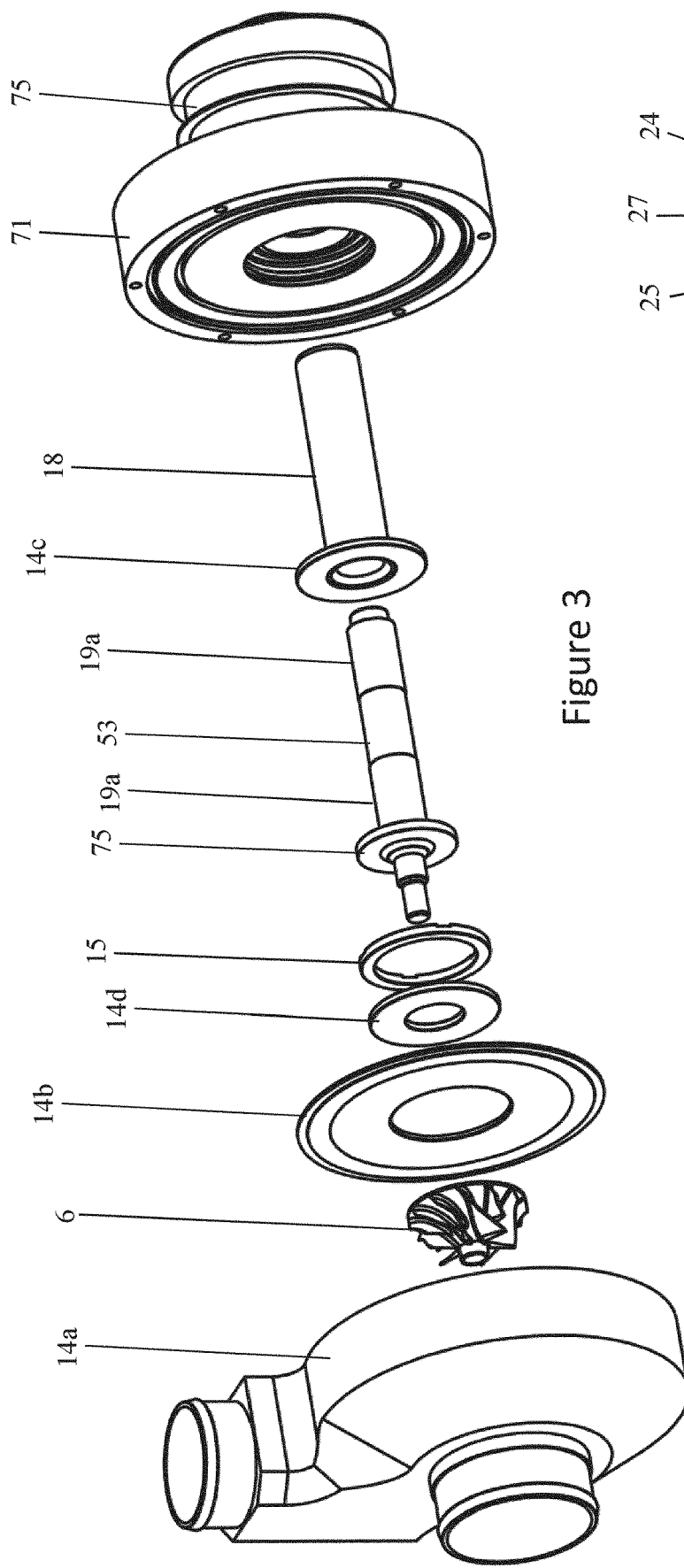
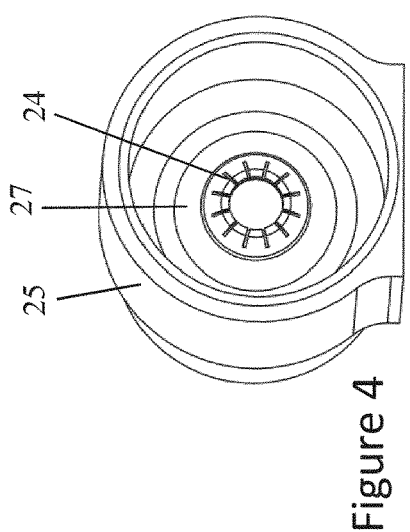
Figure 3
Figure 4

ELECTRICAL MACHINE

BACKGROUND OF THE INVENTION

Field of the Invention

The invention relates to the field of electrical machines, in particular to high-speed electrical machines with gas bearings.

Description of Related Art

An electric motor generally includes a rotor and a stator, the stator including a stator body supporting and housing an electrical stator and bearings. The position of the bearings relative to the stator body can be defined by bearing flanges of the stator body. Often, two journal bearings are present, typically located at opposite sides of the stator, as shown in the arrangement of FIG. 1a (wherein the stator body is not shown). The precision of the alignment of the bearings in this case is mainly defined by the precision with which the bearing flange and stator body are machined. With fluid film and in particular for gas bearings, precise alignment is crucial and this arrangement in general requires special measures such as self-aligning or compliant bushing mountings, or machining, e.g., reaming, of the pair of bearings after assembly. Alternatively, the journal bearings can be arranged on the same side of the stator. This arrangement is often called overhanging motor design (FIG. 1b). With the overhanging design, the two journal bearings can be integrated into a single part, thus precise bearing alignment is easier to achieve. However, this approach generally results in longer rotors and therefore more critical dynamic behaviour of the rotor. Furthermore, windage losses, caused by air resistance, are increased, with a negative impact on the overall motor efficiency.

U.S. Pat. No. 3,502,920 discloses a slotted electrical machine with air gap bearings, in which a bushing is located in the magnetic gap between the stator and the rotor. The bushing can be elastically suspended relative to the stator. It defines on the one hand a radial bearing and can include a centrally located thrust bearing or thrust block as an axial bearing. In order to assemble the machine, the rotor needs to be separated in the axial direction. This design is unfit for high-speed motors.

WO 03/019753 A2 shows a spindle motor in which the rotor rotates in the stator within a thin layer of epoxy forming a cylindrical through bore in the stator and serving to define both a radial bearing surface and an axial bearing surface. The thin layer of epoxy is directly coupled to the stator housing, and any thermally induced deformations of the housing will immediately affect the geometry of the bearing.

US 2006/0061222 A1 and US 2006/0186750 A1 show conventional air bearings.

WO 2017/202941 A1 discloses an electrical machine and associated rotor which address the abovementioned issues by supporting the rotor by means of a radial bearing section forming a radial gas bearing and an axial bearing section forming an axial gas bearing, the stator side parts of these bearing sections being a stator side radial bearing part and a stator side axial bearing part which are rigidly connected to one another and together form a stator bearing structure. Either the stator side radial bearing part or the stator side axial bearing part are rigidly mounted to other parts of the stator, and the respective other part is elastically supported or not supported at all. All or part of the radial bearing section lies in the magnetic gap between the electrical stator and the rotor. It has become apparent that there is a need for transferring heat, e.g., from windage losses (caused by relative movement of the rotor in the stator bore and by relative movement of the bearing surfaces and the air in the air bearings) and electromagnetic losses, away from the rotor and the bearings.

SUMMARY OF THE INVENTION

It is therefore a possible object of the invention to create an electrical machine of the type mentioned initially, which overcomes the disadvantages mentioned above.

It is a further possible object of the invention to simplify the design of an electrical machine of the type mentioned initially. This can improve mechanical stability, manufacturability and quality of the machine.

According to a first aspect of the invention, the electrical machine includes a stator with a stator body supporting an electrical stator and a rotor. The rotor is supported by means of a bearing including a radial bearing section forming a radial gas bearing and an axial bearing section forming an axial gas bearing, the stator side parts of these bearing sections being a stator side radial bearing part and a stator side axial bearing part which are rigidly connected to one another and together form a stator bearing structure. Therein, the stator side radial bearing part is a bushing, and the bushing is radially surrounded by a cooling body, and the bushing is connected to the cooling body by an elastic support including a thermally conducting filler.

Typically, the thermally conducting filler is in contact with both the bushing and with the cooling body along a section of the axial length of the bushing in which the radial bearing section is present.

This allows to efficiently transport heat away from the stator bearing structure, in particular from the bushing. The elastic support allows to compensate for a possible deformation of the stator parts, e.g., by thermal expansion, and to improve vibration characteristics.

The thermal coupling of the bushing to the stator can be effected by using O-rings both as flexible supporting elements and for sealing off the thermally conductive filler, placed in between the O-rings. The filler, depending on its viscosity, can have a dampening effect, as in a squeeze film damper.

The thermally conducting filler typically is a deformable material, in particular,
  a solid, for example, silicone or silicone foam; or
  a fluid or flowable material, for example, a paste or gel;
    in particular
  a liquid, for example, oil with additives.

The thermally conducting filler can absorb relative movement between the bushing and the cooling body, and/or compensate for a possible deformation of the parts, while maintaining physical contact and providing a thermally conductive connection between the bushing and the cooling body.

Thermally conductive in this context means that the coefficient of thermal conductivity is at least 0.5 W/° K/m or at least 1 W/° K/m or at least 2 W/° K/m or at least 4 W/° K/m.

In embodiments, the bushing is radially surrounded by the cooling body and thermally coupled to the cooling body through the thermally conducting filler for at least 20% or 40% or 60% or 80% of the axial length of the bushing.

The thermally conducting filler typically is arranged in a gap between the cooling body and the bushing.

In embodiments, the stator bearing structure extends in the axial direction of the electrical machine from a first end to a second end, and the stator bearing structure is rigidly supported by the other parts of the stator near one of the two ends and near the other end is supported elastically or not at all.

The abovementioned "other parts" can thus be the stator body itself or an assembly that includes the electrical stator and a carrier, with the assembly being elastically supported by the stator body.

The axial direction corresponds to the axis of rotation of the rotor and shall also be called longitudinal direction.

In embodiments, the stator bearing structure is mounted to other parts of the stator by the stator side axial bearing part, in particular an axial bearing assembly, being rigidly mounted to these other parts.

As a result, the stator bearing structure is suspended, at one end, by the axial bearing part, and the remainder of the stator bearing structure is elastically suspended—which eliminates or reduces mechanical stress—but still is thermally coupled to the cooling body.

The journal bearings can be integrated into a single part, thus precise alignment can be easier to achieve than with journal bearings on separate parts.

In embodiments, the radial bearing section extends in the longitudinal direction of the axis of rotation and all bearing elements and cooperating rotor bearing surfaces of the radial bearing section lie outside the magnetic gap between the electrical stator and the rotor.

This means, in other words, that the machine is of the overhanging type, that is, the journal bearing, or the bushing and the cooling body, respectively, are located at different locations than the electrical stator and permanent magnet, when seen along the longitudinal axis of the machine.

In embodiments, the radial bearing section extends in the longitudinal direction of the axis of rotation and at least 60% or 70% or 80% or 90% of the radial bearing section lie outside the magnetic gap between the electrical stator and the rotor.

Here and throughout this document, the terms "rigidly" and "fixed" are used as opposed to "elastically". An elastic connection has a spring rate or a Young's modulus that is at least, for example, 100 or 10'000 or 1'000'000 times larger than in a rigid connection.

A rigid connection is a connection designed such that the connected parts do not move relative to one another during normal operation of the machine. Thus, a rigid connection can be established by screwing parts together or by pressing them against one another with a spring. In this case, the spring is not part of the rigid connection but provides a force that maintains rigidity of the connection.

An elastic support can be an O-ring, typically of a (synthetic) rubber, or a metallic spring.

The term "high speed electrical machine" is taken to cover machines that are suited for more than 100'000 revolutions per minute.

The gas of the gas bearing can be any gas the machine operates in, such as air, a cooling agent, natural gas, etc. The gas bearing can be a passive or an active gas bearing.

The bushing can be made of a ceramic material or another material that provides sufficient mechanical stiffness and does not affect the magnetic field in the magnetic air gap. The advantage of ceramic materials is that they are suited both for gas bearings and can be placed in the magnetic air gap, where they are penetrated by the torque generating magnetic field. Generally, electrical insulators or materials with low electrical conductivity such as ceramics, glass ceramics or technical glasses, plastics, composites, mineral materials etc. can be used to avoid excessive eddy current losses caused by the alternating magnetic air gap field.

In embodiments, the electrical machine is of the slotless type. In other words, the electrical stator includes an air gap winding rather than slotted windings. In other embodiments, the electrical machine is of the slotted type.

In embodiments, the cooling body includes coolant channels for carrying a coolant medium to transport heat away from the cooling body. The coolant medium typically is a fluid, such as a gas or liquid.

According to a second aspect of the invention, which can be implemented independently or in combination with one or more of the other aspects, the cooling body is radially surrounded by a stator flange (which can also be called "stator cooling jacket), and the stator body and the stator flange are manufactured as a single part or are materially bonded to one another. This allows to thermally couple the stator body and the cooling body and thereby cool the stator body via the cooling body.

Typically, the stator body houses the electrical stator. "Materially bonded", also called "substance-to-substance bonded" typically is done by welding or soldering.

In embodiments, the stator flange forms at least part of a wall of a coolant channel. This allows for the coolant to efficiently cool both the stator body and the cooling body.

In embodiments, the stator body includes coolant channels, the coolant channels being arranged in a region that radially surrounds the electrical stator. It can be the case that the stator body includes an outer stator body radially surrounding an inner stator body, wherein the coolant channels are arranged between the outer stator body and the inner stator body.

According to a third aspect of the invention, which can be implemented independently or in combination with one or more of the other aspects, a heat transfer wall is arranged axially adjacent to the electrical stator, and an electrically non-conducting and thermally conducting gap tube is attached to the stator radially adjacent to the rotor where the rotor includes a permanent magnet, and the heat transfer wall is thermally coupled to the gap tube. This allows to cool the air gap of the motor via the heat transfer wall and the other parts of the stator body.

The terms "axially adjacent" and "radially adjacent" are understood to mean "adjacent when seen in the direction of the axis of rotation" and "adjacent when seen in a radial direction", respectively.

In embodiments, the heat transfer wall is arranged between the electrical stator and the cooling body. This can be the case when the electrical stator and the cooling body are located, seen in the axial direction, in different regions along the axis, separated by the heat transfer wall.

In embodiments, the cooling body is arranged, when seen in the radial direction, around the electrical stator. The heat transfer wall can be arranged to lie at one side of both the electrical stator and the cooling body, and form a thermal bridge between the two, for transferring heat from the electrical stator to the cooling body.

In embodiments, gap bars, being elongated elements or rods, are present instead of the gap tube. Gap bars can be arranged in the slots of a slotted electrical machine.

The gap tube or gap bars are thus arranged, seen in an axial direction along the longitudinal axis of rotation, at least at locations where the permanent magnet is present.

Typically, the gap tube is arranged in the magnetic gap between the electrical stator and the rotor.

Thermally coupling the heat transfer wall to the gap tube or gap bars can be done, for example, by a force fit such as a press fit, or by a material fit. In particular, an adhesive can be used, for example, a thermally conductive adhesive.

In order for the gap tube or gap bars to be electrically non-conducting and thermally conducting, they can be made of a ceramic material with high thermal conductivity, for example higher than 20 W/° K/m or 40 W/° K/m or 60 W/° K/m or 100 W/° K/m or 140 W/° K/m such as Aluminium Nitride or Silicon Carbide or certain grades of Silicon Nitride.

In embodiments, the heat transfer wall includes radial slits for reducing eddy currents in the heat transfer wall caused by the nearby permanent magnet of the rotor. In embodiments there are at least 6 or 12 or 18 slits. The slits can be equally spaced.

In embodiments, the heat transfer wall and the gap tube form part of an airtight separation between the electrical stator and the rotor. This allows to separate the air bearings, which are sensitive to contamination by small particles, from the spaces inside the stator body, which generally are prone to being contaminated.

In embodiments, the electrical machine includes a heat transfer flange thermally coupled to the gap tube at a distal end opposite to a proximal end of the gap tube at which the heat transfer wall is arranged. The heat transfer flange can include coolant channels. This allows to remove heat at both ends of the gap tube and thereby better cool the gap tube.

According to a fourth aspect of the invention, which can be implemented independently or in combination with one or more of the other aspects, the axial bearing assembly is compressed in the axial direction by a resilient element, wherein this resilient element acts as a disc shaped spring and also serves as a wall of a flow path of a compressor driven by the electrical machine, in particular as a wall of a centrifugal compressor's diffuser. This allows for a space saving and simple construction of the combination of motor and compressor.

In general, a disc spring or Belleville washer, also known as a coned-disc spring, conical spring washer, plate spring, Belleville spring or cupped spring washer, is a generally conical shell (in its loaded or in its unloaded state) which can be loaded along its axis either statically or dynamically.

In embodiments, the disc spring is compressed in the axial direction by a compressor housing part, preferably by the spiral casing of the compressor. This allows for a further simplification of the construction of the combination of motor and compressor.

The compressor housing typically includes a plenum and optionally at least one wall of a diffuser leading into the plenum. The wall can be shaped as a single part with the remainder of the housing, or as a separate part.

In embodiments, a first stator disc and a second stator disc of the axial bearing assembly, and a spacer element arranged between the two stator discs (are pressed against one another by the disc spring.

In embodiments, the first stator disc is integrally shaped with the bushing. In other words, the first stator disc of the axial bearing assembly and the bushing are manufactured as a single piece or part.

A thrust bearing or axial bearing typically includes a rotor disc in the rotor and, at each side of the rotor disc, as seen in the axial direction, an adjacent stator disc on the stator. The two stator discs are spaced apart by a shim or spacer element such that a well-defined gap is formed between the rotating and stationary parts of the thrust bearing. Together, stator discs, spacer and connecting elements form the axial bearing assembly.

In embodiments, the stator disc of the axial bearing assembly and the bushing each include an axially facing surface as an axial reference surface and the two axial reference surfaces are placed against one another. Thereby they ensure that the axis of rotation is normal to bearing surfaces of the axial bearing assembly.

In embodiments, the stator disc and the bushing that are placed against one another—if they are not integrally shaped—are pressed against one another by a resilient element, in particular, the disc spring.

BRIEF DESCRIPTION OF THE DRAWINGS

The subject matter of the invention will be explained in more detail in the following text with reference to exemplary embodiments which are illustrated in the attached drawings, which show:

FIG. 1a-b longitudinal section views of prior art machines with gas bearings;
FIG. 3 an exploded view of a similar embodiment;
FIG. 4 a stator body, showing an arrangement of slits.

DETAILED DESCRIPTION OF THE INVENTION

Figure 5:
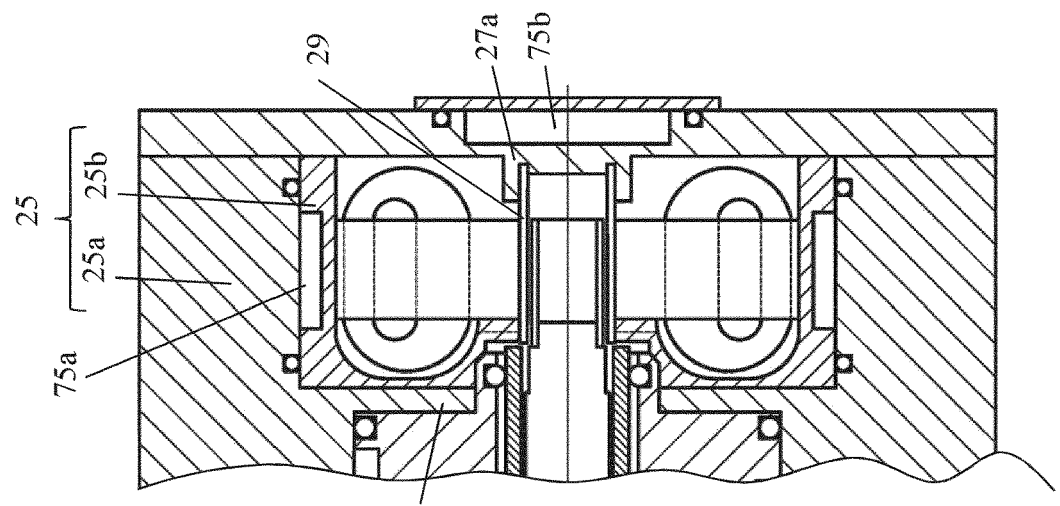
FIG. 5 a sectional view with details of a further embodiment.

In principle, identical parts or parts with an analogue function are provided with the same reference symbols in the figures.

FIG. 1a schematically shows a prior art electrical machine with air or gas bearings. Therein, a stator body (not shown) carries an electrical stator 3 with a coil 31 and a core 32 and further carries an axial bearing section 12 and a radial bearing section 17 in which a rotor 5 with a shaft 51 and a permanent magnet 52 is arranged to rotate. Individual bearing elements 19 constituting the radial bearing section 17 are arranged at opposite ends of the machine, with the electrical stator 3 in between. FIG. 1b shows the same elements in a prior art overhanging arrangement, with the individual bearing elements 19 arranged at the same end of the machine, both at the same side of the electrical stator 3.

Here and in the other arrangements, a fan 6 or impeller driven by the electrical machine operating as a motor is shown as an example for an application of the machine. Naturally, any other end device, in particular one requiring a high speed drive can be arranged to be driven by the electrical machine.

Figure 2:
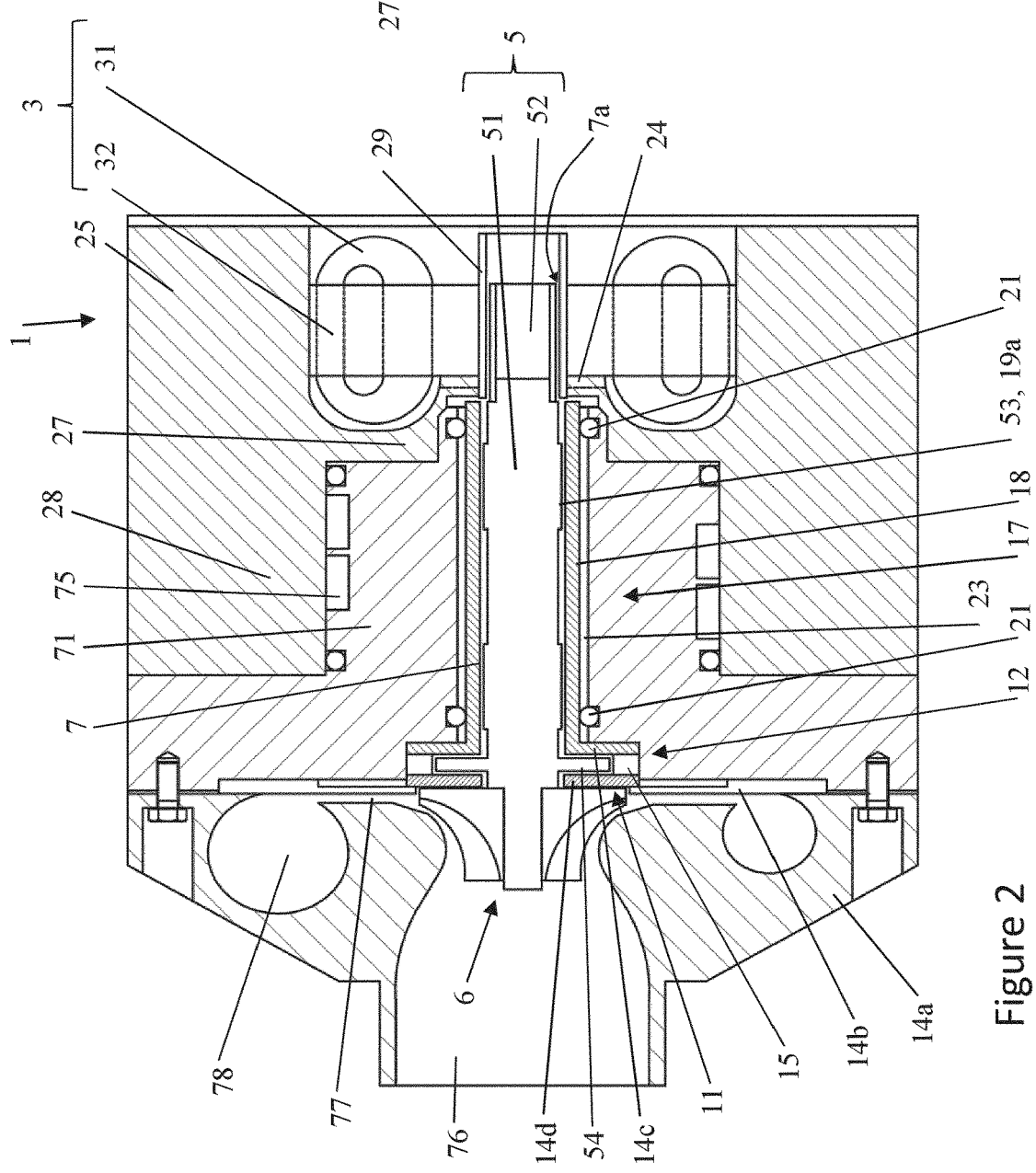
FIG. 2 an embodiment of an electrical machine.

FIG. 2 schematically shows an embodiment, with the elements already mentioned, but in a different arrangement. In addition, the stator 1 is shown, including a stator body 25 serving as a housing and support for the electromagnetic components of the stator 1, that is, the coils 31 and core 32.

The parts of the axial bearing section 12 and the radial bearing section 17 that are attached to the stator as opposed to the rotor form a stator bearing structure. This stator bearing structure includes the stator-side bearing surfaces of the axial bearing section 12 and the radial bearing section 17 and defines the relative position of these surfaces. The stator bearing structure is designed to be rigid in itself and to be assembled and aligned easily to high precision.

The axial bearing section 12 or thrust bearing section on the part of the rotor includes a generally disk-like thrust plate or rotor disc 54 extending outwardly from an outer peripheral surface of the shaft 51 near one end of the rotor 5. The rotor disc 54 has two oppositely facing axially facing surfaces, which in cooperation with two stator discs 14c, 14d, between which the rotor disc 54 is arranged to rotate, form the axial bearing.

The axial bearing section 12 on the part of the stator includes these stator discs 14c, 14d, that is, a first stator disc 14c and second stator disc 14d, which are part of an axial bearing assembly 11. The axial bearing assembly 11 further includes a spacer element 15, typically a washer, which defines a distance between axially facing surfaces of the stator discs 14c, 14d facing each other.

The radial bearing section 17 or journal bearing section on the part of the rotor includes at least part of the outer peripheral surface of the shaft 51. This part functions as a rotor bearing surface 53, which in cooperation with a bushing 18 form the radial bearing, with a bearing air gap 7. The outside of the rotor bearing surface 53 can have radially outward protruding sections 19a. In this case, the inside of the bushing 18 can have an unvarying inner diameter. Alternatively or in addition, the bushing 18 can have bearing elements in the form of radially inward protruding sections located at separate regions along the inside of the bushing 18.

The radial bearing section 17 on the part of the stator includes this bushing 18. The first stator disc 14c is, in this embodiment, integrally shaped with the bushing 18.

The stator discs 14c, 14d and the spacer element 15 can be clamped together by means of a disc spring 14b, in particular by exerting a force in the axial direction. The force exerted by the disc spring 14b can also clamp the first stator disc 14c against the cooling body 71.

The disc spring 14b also serves as a wall of a diffuser of a compressor driven by the electrical machine. The compressor is a centrifugal compressor, with a centrifugal impeller 6, including a rotating set of vanes (or blades) that gradually raises the energy of the working gas coming from an inlet 76. Downstream of the impeller 6 in the flow path, a diffuser 77 converts the kinetic energy (high velocity) of the gas into pressure by gradually slowing (diffusing) the gas velocity. The gas is discharged from the diffuser into a plenum 78, also called volute or scroll.

The plenum 78 and one wall of the diffuser 77 are formed as part of a compressor housing 14a. The compressor housing or spiral casing 14a is rigidly attached to the cooling body 71 and thereby clamps or compresses the disc spring 14b against the first stator disc 14c.

At a first and second end of the bushing 18, it is supported by the cooling body 71 by means of elastic supports 21, for example, O-rings. This dampens mechanical oscillations that might arise at the otherwise free end of the bushing 18. The elastic support together with a gap between the bushing 18 and the cooling body 71 allows to compensate for a possible deformation of the stator parts, e.g. by thermal expansion The gap between the bushing 18 and the cooling body 71 can be filled with thermally conducting filler 23. This allows dissipating heat from the bushing 18 to the cooling body 71.

The bushing 18 typically lies completely or mostly outside the magnetic (air) gap that separates the electrical stator 3 and the rotor 5, and/or the volume through which the magnetic flux driving the motor passes. This usually also holds for the outward protruding sections 19a and/or bearing elements 19, if present, and cooperating rotor and stator bearing surfaces of the radial bearing section 17.

It is also possible for the radial bearing section, seen in the axial or longitudinal direction, to lie in the same region as the as the electrical stator. In this case, the thermally conducting filler is arranged between the bushing and the electrical stator.

The position of the bushing 18 relative to the axial bearing assembly 11 is rigidly constrained by only one mechanical link. This link is defined by the bushing 18 and a first stator disc 14c of the stator bearing structure 11 being integrally shaped, or, if they are not, by axial reference surfaces on the bushing 18 and one of the stator discs 14, at which surfaces the bushing and the stator disc are clamped against one another.

The only other mechanical links between the bushing 18 and the axial bearing assembly 11—via the cooling body 71—are elastic or resilient since they run via the elastic supports 21 and the thermally conducting filler 23. In this way, the relative position of these parts and in particular of the bushing 18 with respect to the stator discs 14 is not overconstrained. Thus, the precision of the alignment of the axial and radial bearing sections is easy to achieve, by precise machining of the integral bushing 18 and first stator disc 14c, or of the axial reference surfaces, and can be maintained under thermal and mechanical stress.

In other words, the axial bearing assembly 11 and bushing 18—together forming the stator bearing structure—and the rotor 5 can be part of one or more kinematic loops, where each loop includes at least one resilient element. Conversely, the axial bearing assembly 11 and bushing 18 are not part of an overconstrained loop or arrangement.

Furthermore, the location of the bushing 18, and thus the axis of rotation, is constrained by the location of the cooling body 71 in a fixed manner by not more than one mechanical link, that is
- via the attachment of the axial bearing assembly 11 to the cooling body 71.
- via the attachment of the bushing 18 to the cooling body 71.

A stator flange 28 is integrally shaped with the stator body 25. The stator flange 28 is a hollow cylinder that radially surrounds at least part the cooling body 71, in particular a part of the cooling body that is actively cooled. Between the cooling body 71 and the stator flange 28, coolant channels 75 are arranged. The FIGS. 2 and 3 show the coolant channels 75 shaped in the cooling body 71, but alternatively or in addition, they can be shaped in the stator flange 28.

The stator body 25 includes a heat transfer wall 27 arranged between the cooling body 71 and the electrical stator 3. The heat transfer wall 27 extends in the radial direction from a peripheral section of the stator body 25, where it is joined to the stator flange 28, to an inner section, where it is joined to a gap tube 29. The gap tube 29 is a hollow cylinder arranged in the air gap 7a of the electrical machine (motor air gap) and is made of a thermally conducting but electrically non-conducting material. The heat transfer wall 27 is arranged to guide heat away from the gap tube 29 and thus from the air gap of the electrical machine. The heat transfer wall 27 is thermally coupled to the gap tube 29 at a first end of the gap tube, proximal to the bushing 18.

The heat transfer wall 27 includes radial slits 24 in order to reduce eddy currents being generated in the heat transfer wall 27 by the alternating magnetic field of the permanent magnet 52 of the rotor 5. The radial slits 24 can reach all the way through the heat transfer wall 27, in which case the slits can be filled with a non-conducting material in order to keep the heat transfer wall 27 airtight. Alternatively, the radial slits 24 are made to leave a thin section of the heat transfer wall 27 remain, in order to keep the heat transfer wall 27 airtight.

The main structural components, in particular the compressor housing 14a, the cooling body 71, and the stator body 25, including the stator flange 28, are typically made of a metal with good thermal conductivity, in particular of Aluminium or an Aluminium alloy.

FIG. 3 shows an exploded view of a number of elements of FIG. 2. FIG. 4 shows a view of the stator body 25 alone (with slightly different geometric features on the outside than in FIG. 2), illustrating the arrangement of the radial slits 24.

FIG. 5 shows a sectional view with details of a further embodiment. Therein, the stator body 25 includes coolant channels 75a. These coolant channels 75a can be formed by the stator body 25 including separate parts, an outer stator body 25a radially surrounding an inner stator body 25b. Then the coolant channels 75a are shaped at an outer side of the inner stator body 25b, and/or at an inner side of the outer stator body 25a, where these inner and outer sides are in contact. The inner and outer stator body are rigidly attached to one another.

Alternatively, the coolant channels 75a can be formed by manufacturing the stator body 25 by an additive manufacturing process, forming the coolant channels 75a as the stator body 25 is created.

The gap tube 29 is shown to be thermally coupled, at a second end or distal end, to a heat transfer flange 27a Whereas the heat transfer wall 27 is joined to the gap tube 29 at the outside circumference of the gap tube 29, the heat transfer flange 27a can be joined to the gap tube 29 at the inside and/or at the outside circumference of the gap tube 29. The heat transfer flange 27a includes coolant channels 75b. The heat transfer flange 27a is rigidly attached to the stator body 25, or it can be part of the stator body 25, in particular of the inner stator body 25b.

The thermal coupling of the heat transfer wall 27 and/or of the heat transfer flange 27b to the gap tube 29 can be effected, for example, with thermally conductive filler, placed in between O-rings, with thermally conducting glue, or by a press fit.

Wherever coolant channels 75, 75a, 75b are referred to, it is understood that further conduits for supplying and removing a coolant medium are present.

The invention claimed is:

1. An electrical machine comprising a stator with a stator body supporting an electrical stator and a rotor, the rotor being supported by means of a bearing comprising a radial bearing section forming a radial gas bearing and an axial bearing section forming an axial gas bearing, the stator side parts of these bearing sections being a stator side radial bearing part and a stator side axial bearing part which are rigidly connected to one another and together form a stator bearing structure,
   wherein the stator side radial bearing part is a bushing,
   and wherein the bushing is radially surrounded by a cooling body, and the bushing is connected to the cooling body by an elastic support comprising a thermally conducting filler.

2. The electrical machine of claim 1, wherein the thermally conducting filler is in contact with both the bushing and with the cooling body along a section of the axial length of the bushing in which the radial gas bearing is present.

3. The electrical machine of claim 1, wherein the bushing is radially surrounded by the cooling body and thermally coupled to the cooling body through the thermally conducting filler for at least 20% of the axial length of the bushing.

4. The electrical machine of claim 1, wherein the stator bearing structure is mounted to other parts of the stator by the stator side axial bearing part, in particular an axial bearing assembly, being rigidly mounted to these other parts.

5. The electrical machine of claim 1, wherein the radial bearing section extends in the longitudinal direction of the axis of rotation and all bearing elements and cooperating rotor bearing surfaces of the radial bearing section lie outside the magnetic gap between the electrical stator and the rotor.

6. The electrical machine of claim 1, wherein the cooling body comprises coolant channels for carrying a coolant medium to transport heat away from the cooling body.

7. An electrical machine comprising a stator with a stator body supporting an electrical stator and a rotor, the rotor being supported by means of a bearing comprising a radial bearing section forming a radial gas bearing and an axial bearing section forming an axial gas bearing, the stator side parts of these bearing sections being a stator side radial bearing part and a stator side axial bearing part which are rigidly connected to one another and together form a stator bearing structure,
   wherein the stator side radial bearing part is a bushing,
   and wherein the bushing is radially surrounded by a cooling body, and the cooling body is radially surrounded by a stator flange, and the stator body and the stator flange are manufactured as a single part or are materially bonded to one another.

8. The electrical machine of claim 7, wherein the cooling body comprises coolant channels for carrying a coolant medium to transport heat away from the cooling body and wherein the stator flange forms at least part of a wall of a coolant channel.

9. The electrical machine of claim 7, wherein the stator body comprises coolant channels, the coolant channels being arranged in a region that radially surrounds the electrical stator, and in particular wherein the stator body comprises an outer stator body radially surrounding an inner stator body and wherein the coolant channels are arranged between the outer stator body and the inner stator body.

10. An electrical machine, comprising a stator with a stator body supporting an electrical stator and a rotor, the rotor being supported by means of a bearing,
   wherein a heat transfer wall is arranged axially adjacent to the electrical stator, and an electrically non-conducting and thermally conducting gap tube is attached to the stator radially adjacent to the rotor where the rotor comprises a permanent magnet, and the heat transfer wall is thermally coupled to the gap tube.

11. The electrical machine of claim 10, wherein the heat transfer wall is arranged between the electrical stator and the cooling body.

12. The electrical machine of claim 10, wherein the heat transfer wall comprises radial slits for reducing eddy currents in the heat transfer wall caused by the nearby permanent magnet of the rotor.

13. The electrical machine of claim 10, wherein the heat transfer wall and the gap tube form part of an airtight separation between the electrical stator and the rotor.

14. The electrical machine of claim 10, comprising a heat transfer flange thermally coupled to the gap tube at a distal end opposite to a proximal end of the gap tube at which the heat transfer wall is arranged, in particular wherein the heat transfer flange comprises coolant channels.

15. An electrical machine, comprising a stator with a stator body supporting an electrical stator and a rotor, the rotor being supported by means of a bearing comprising a radial bearing section forming a radial gas bearing and an axial bearing section forming an axial gas bearing, the stator side parts of these bearing sections being a stator side radial bearing part and a stator side axial bearing part which are rigidly connected to one another and together form a stator bearing structure,
- wherein the stator bearing structure is mounted to other parts of the stator by the stator side axial bearing part, in particular an axial bearing assembly, being rigidly mounted to these other parts;
- wherein the axial bearing assembly is compressed in the axial direction by a resilient element, wherein this resilient element acts as a disc spring and also serves as a wall of a flow path of a compressor driven by the electrical machine, in particular as a wall of a centrifugal compressor's diffuser.

16. The electrical machine of claim 15, wherein the disc spring is compressed in the axial direction by a compressor housing of the compressor, in particular by a spiral casing of the compressor.

17. The electrical machine of claim 15, wherein a first stator disc and a second stator disc of the axial bearing assembly, and a spacer element arranged between the two stator discs are pressed against one another by the disc spring.

18. The electrical machine of claim 17, wherein the stator side radial bearing part is a bushing and the first stator disc is integrally shaped with the bushing.

\* \* \* \* \*